United States Patent [19]

Schlunt

[11] Patent Number: 4,965,761
[45] Date of Patent: Oct. 23, 1990

[54] FAST DISCRETE FOURIER TRANSFORM APPARATUS AND METHOD

[75] Inventor: Richard S. Schlunt, Loma Linda, Calif.

[73] Assignee: General Dynamics Corporation, Pomona Div., Pomona, Calif.

[21] Appl. No.: 201,814

[22] Filed: Jun. 3, 1988

[51] Int. Cl.$^5$ .......................................... G06F 15/332
[52] U.S. Cl. .................................................. 364/726
[58] Field of Search ........................ 364/726, 725, 754

[56] References Cited

U.S. PATENT DOCUMENTS

| | | | |
|---|---|---|---|
| 3,544,775 | 12/1970 | Bergland et al. | 364/726 X |
| 3,638,004 | 1/1972 | Sloane et al. | 364/726 |
| 3,686,490 | 8/1972 | Goldstone | 364/726 |
| 3,746,848 | 7/1973 | Clary | 364/726 |
| 3,778,606 | 12/1973 | Schmitt et al. | 364/726 |
| 3,816,729 | 6/1974 | Works | 364/726 |
| 3,881,100 | 4/1975 | Works et al. | 364/726 |
| 3,889,225 | 6/1975 | McKenzie et al. | 328/13 |
| 4,048,485 | 9/1977 | Nussbaumer | 364/728.02 |
| 4,054,785 | 10/1977 | Lehmann | 364/726 |
| 4,092,723 | 5/1978 | Picquendar et al. | 364/726 |
| 4,164,036 | 8/1979 | Wax | 364/486 |
| 4,223,185 | 9/1980 | Picou | 364/726 |
| 4,225,864 | 9/1980 | Lillington | 342/194 |
| 4,227,252 | 10/1980 | Godard | 375/113 |
| 4,554,629 | 11/1985 | Smith, Jr. | 364/200 |
| 4,630,229 | 12/1986 | D'Hondt | 364/726 |
| 4,698,769 | 10/1987 | McPherson et al. | 364/726 X |
| 4,748,579 | 5/1988 | Zibman et al. | 364/726 |
| 4,791,590 | 12/1988 | Ku et al. | 364/726 |

OTHER PUBLICATIONS

"The Time-Saver: FFT Hardware", by Richard Klahn et al., Electronics, Jun. 24, 1968, pp. 92-97.
"What is the Fast Fourier Transform?", Cochran et al., Proceedings of the IEEE, vol. 55, No. 10, Oct., 1967, p. 1664ff.

Primary Examiner—Gary V. Harkcom
Assistant Examiner—Tan V. Mai
Attorney, Agent, or Firm—Henry Bissell; Leo R. Carroll

[57] ABSTRACT

An electronic digital system for performing discrete Fourier transforms in real time. Read only memory (ROM) modules are used as look-up tables for providing inputs for multiplier stages corresponding to sequences of sample signals as well as for logic and other input converting elements of the system. Two such systems are coupled together so that their real and imaginary output signal components may be additively and subtractively combined. The entire transform output is available one cycle period after the last sample input.

5 Claims, 2 Drawing Sheets

FAST DISCRETE FOURIER TRANSFORM APPARATUS AND METHOD

BACKGROUND OF THE INVENTION

1. Field of the Invention.

This invention relates to the field of signal processing for identification of spectral content and, more particularly, to the identification of received electromagnetic signals by development of the corresponding discrete Fourier transform.

2. Description of the Related Art.

The discrete Fourier transform (DFT) is particularly useful in facilitating signal analysis, such as power spectrum analysis and the like. An algorithm for the computation of Fourier coefficients which requires much less computational effort than had been previously required was reported by Cooley and Tukey in 1965. This method is now generally referred to as the "fast Fourier transform" (FFT) and is effective for efficiently computing the discrete Fourier transform of a time series of discrete data samples.

The discrete Fourier transform (DFT) is a transform in its own right, such as the Fourier integral transform or the Fourier series transform. It is a powerful reversible mapping operation for time series. It has mathematical properties that are entirely analogous to those of the Fourier integral transform. In particular, it defines a spectrum of a time series; multiplication of the transforms of two time series corresponds to convolving the time series.

For digital techniques to be used for analyzing a continuous waveform, it is necessary that the data be sampled (usually at equally spaced intervals of time) in order to produce a time series of discrete samples which can be fed to a digital computer for processing. Such a time series adequately represents the continuous waveform so long as the waveform is frequency band-limited and the samples are taken at a rate that is at least twice the highest frequency of interest in the waveform, thus satisfying the Nyquist criterion. The DFT of such a time series is closely related to the Fourier transform of the continuous waveform from which samples have been taken to form the time series, thus making the DFT particularly useful for power spectrum analysis and frequency identification. Since the announcement of the fast Fourier transform, the FFT has come into wide use as a powerful tool for computing the DFT of a time series. In comparison with the number of operations (and corresponding computer time involved) required for the calculation of the DFT coefficients with straightforward procedures, the number of operations required in using FFT techniques is vastly reduced, particularly where the time series consists of a relatively large number of samples. For example, it has been reported that for a time series represented by 8192 samples, the computations using the FFT method require about five seconds for the evaluation of all 8192 DFT coefficients on an IBM 7094 computer, whereas conventional procedures take on the order of half an hour.

Since the announcement of the fast Fourier transform algorithm, considerable effort has gone into developing and refining the techniques involved in specific applications, and the prior art contains many references relating to use of the FFT in processing of data. For example, a tutorial discussion of the FFT and its relationship to the DFT is to be found in an article by Cochran et al entitled "What Is The Fast Fourier Transform?," PROCEEDINGS OF THE IEEE, Vol. 55, No. 10, October, 1967, pp. 1664ff. Use of a special purpose computer utilizing FFT techniques is detailed in a publication by Klahn et al, entitled "The Time-Saver: FFT Hardware", ELECTRONICS, June 24, 1968, pp. 92–97.

While the FFT presents a considerable improvement over previously known signal processing techniques, it is not without its disadvantages, particularly when considered in a particular utilization to which the present invention is directed—namely, the analysis of a received signal for immediate identification of the spectral content. For example, the FFT requires using all frequencies; it cannot selectively look at a single frequency or band of frequencies within the received signal bandwidth. Also, the FFT develops an inherent transport delay because the FFT processor cannot begin operation until all samples of the time series have been acquired. By contrast, arrangements in accordance with the present invention have no transport delay and the output of the transform can be provided within one sample period after the last sample is received.

SUMMARY OF THE INVENTION

The present invention, which may be referred to as the "Fast Discrete Fourier Transform" (FDFT), utilizes other techniques than the algorithm of the FFT to perform a digital discrete Fourier transform in real time.

The discrete Fourier transform of a sequence $X(0)$, $X(1), \ldots, X(N-1)$ may be defined by the following:

$$F(\omega) = \sum_{n=0}^{N-1} x(n) \exp(-j\omega nT), \quad (1)$$

where T is the time between samples (the sample interval) and $\omega$ is in radians. If $\omega = 2\pi k/NT = kr$, then $$F(kr) = \sum_{n=0}^{N-1} x(n)[\cos(nkr) - j\sin(nkr)] \quad (2)$$

and $$F(kr + mrN/L) = \sum_{n=0}^{N-1} x(n)[\cos(nkr + nm2\pi/L) - j\sin(nkr + nm2\pi/L)] \quad (3)$$

F(kr+mr N/L) represents the value of F at some frequency removed from k/NT by some multiple of 1/LT. Expanding, using trigonometric identities, this expression can be rewritten as $$\sum_{n=0}^{N-1} x(n)[\cos(nkr)\cos(nm2\pi/L) - \sin(nkr)\sin(nm2\pi/L)] -$$

$$j \sum_{n=0}^{N-1} x(n)[\sin(nkr)\cos(nm2\pi/L) - \cos(nkr)\sin(nm2\pi/L)]$$

It can be seen that if the products $X(n)\cos(nkr)$ and $X(n)\sin(nkr)$ are known, then $X(n)\cos(nkr+nm2\pi/L)$ and $X(n)\sin(nkr+nm2\pi/L)$ can be generated.

In one particular arrangement in accordance with the invention, these values are generated by circuitry comprising a plurality of read only memories (ROMs) and adders coupled to the output of a counter. The ROMs are, in effect, look-up tables providing a particular output depending upon the address which is activated. The functions X(n)cos(A) and X(n)sin(A) are applied to separate pairs of ROMs at opposite sides of a pair of adders. These functions, in digital form, are used as the addresses for two of the ROMs. The output of the ROM addressed by X(n)cos(nkr) is X(n)cos(nkr-)cos(nm2π/L), and the output of the ROM addressed by X(n)sin(nkr) is −X(n)sin(nkr)sin(nm2π/L). These two output values are then added to form X(n)cos(nkr+nm2π/L). Since cos(nm2π/L) and sin(nm2π/L) are repetitive after L values of n, it is only necessary to provide L different products for each input address to the ROM. If X(n)cos(nkr) is represented by 8 bits and L=16, then only 4 more data bits (for a total of 12 bits) are required to provide 16 different addresses, of which the first 8 bits are X(n)cos(nkr). The four-bit address is determined by the value of n.

X(n)sin(nkr+nm2π/L) can be generated in similar fashion by applying the input signals to the second pair of ROMs coupled to the second adder. Thus, F(kr +mr N/L) can be calculated at the same time F(kr) is calculated. M is allowed to run from 1 to L-1, after which it repeats The circuitry just described for the generation of the functions specified can be fabricated as a single module. Using L-1 such modules, L values of F can be calculated simultaneously.

An arrangement in accordance with the invention to generate F in real time comprises respective sine and cosine multipliers to which the input X(n) function is applied. Between samples, N/L products are formed by the respective multipliers. The multiplier outputs are applied to the L-1 modules as separate parallel inputs. These product outputs are also applied to an accumulator to develop the real and imaginary parts of the function F(kr). Simultaneously the modules produce N/L sin and cos products which are summed with previous product outputs in associated accumulators. At the end of NT, the entire transform is available at the output of the accumulator.

Thus it will be seen that the entire transform is available T seconds after the last sample is received, and the FDFT circuit has no transport delay. This scheme uses a minimum number of multipliers and operates with minimal memory. The circuitry is modular in construction. It is possible to multiplex the waveform samples and, if desired, the throughput level can be increased by the use of additional multipliers.

BRIEF DESCRIPTION OF THE DRAWING

A better understanding of the present invention may be realized from a consideration of the following detailed description, taken in conjunction with the accompanying drawing in which.

DESCRIPTION OF THE PREFERRED EMBODIMENT

Figure 1:
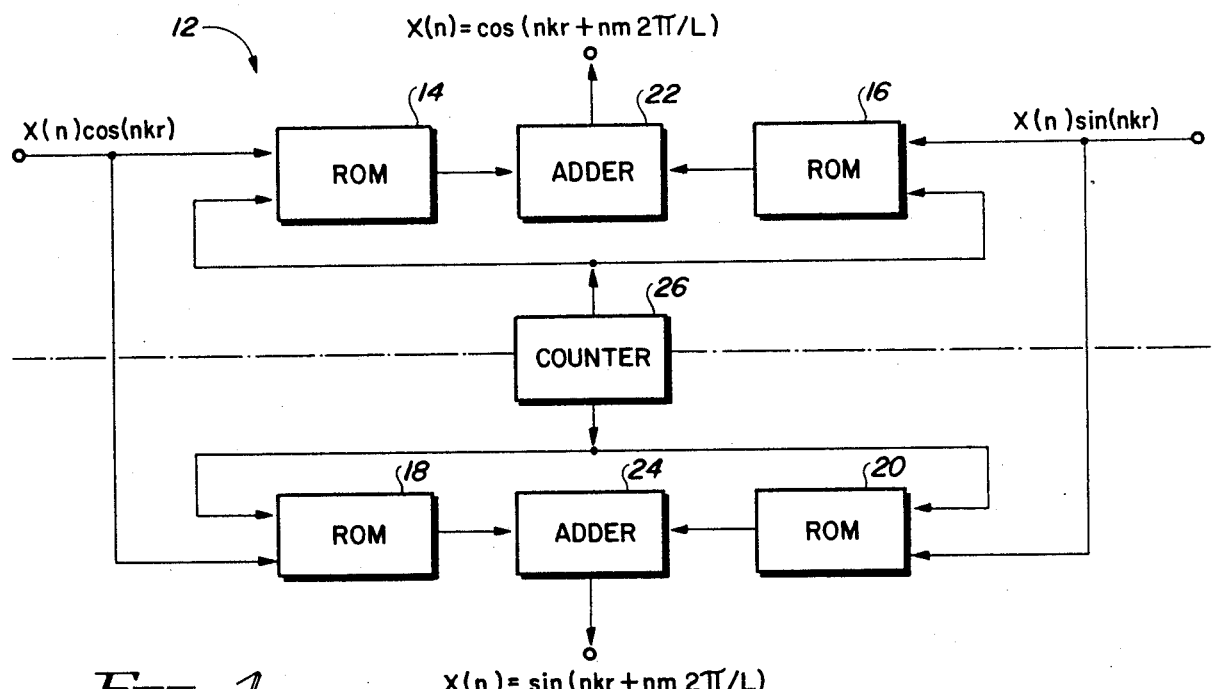
FIG. 1 is a schematic block diagram of circuitry for a calculation module.

FIG. 1 is a schematic block diagram of the circuitry of a calculational module 12 of which a plurality is required to implement the calculation of a fast discrete Fourier transform in accordance with the method of the present invention. Four read-only memories (ROMs) 14, 16, 18, and 20 are used to generate intermediate terms necessary for the overall calculation. The ROMs 14, 16, 18, and 20 function as look-up tables. When addressed by X(n) cos(nkr) in digital form, ROM 14 gives X(n) cos(nkr) cos(nm2π/L) as its output which becomes one of the two inputs to adder 22. When ROM 16 is addressed by X(n) sin(nkr) in digital form, its output is −X(n) sin(nkr) sin(nm2π/L) which becomes the other input to adder 22. The two inputs to adder 22 are summed to form the output X(n) cos(nkr+nm2π/L). Similarly, the digital inputs X(n) cos(nkr) and X(n) sin(nkr) are used to address ROMs 18 and 20, respectively, to produce the products X(n) sin(nkr) cos(nm2π/L) and X(n) cos(nkr) sin(nm2π/L). The outputs of ROM 18 and ROM 20 are added together by adder 24 to produce the output X(n) sin(nkr+nm2π/L), in accordance with well-known trigonometric identities.

Since the functions cos(nm2π/L) and sin(nm2π/L) repeat after L values of n, it is only necessary to provide L different products for each input address to a particular ROM. If X(n) cos(nkr) is represented by eight bits and if L=16, then four more bits are needed (12 bits total) to provide 16 addresses, the first eight bits of which are X(n) cos(nkr). The four-bit address is determined by the value of n. Counter 26 provides the standard clock pulses needed for synchronism.

It is possible to calculate F(kr+mrN/L) at the same time that F(kr) is being calculated. The index m is allowed to run from 1 to L-1. Using L-1 modules such as the one depicted in FIG. 1, the L values of F can be calculated simultaneously.

Figure 2:
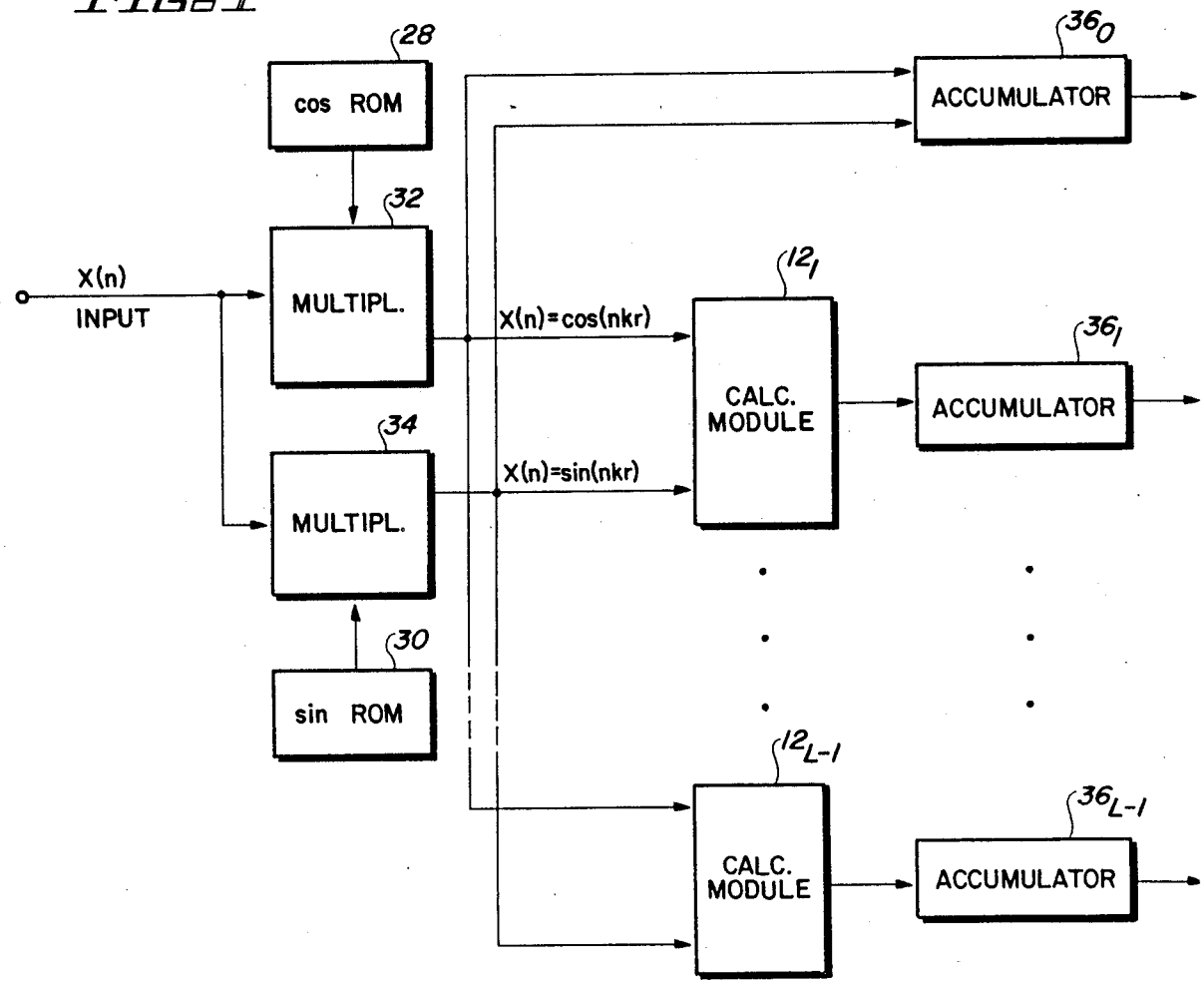
FIG. 2 is a schematic block diagram of circuitry for generating a discrete Fourier transform in real time.

A circuit to generate F in real time is shown in schematic block diagram form in FIG. 2. The output of a cosine ROM 28 is combined with a signal input X(n) in a cosine multiplier 32 to produce the product X(n) cos(nkr). Similarly, a sine ROM 30 provides an input which is combined with the same signal input X(n) in a sine multiplier 34 to produce an output X(n) sin(nkr). The outputs of cosine multiplier 32 and sine multiplier 34 are fed to each of L-1 modules $12_1$ through $12_{L-1}$. Each module 12 has its two outputs connected to the inputs of an accumulator 36. There are thus L-1 accumulators $36_1$ through $36_{L-1}$ corresponding to the L-1 modules $12_1$ through $12_{L-1}$. In addition, there is an accumulator $36_0$ which has as its inputs the outputs of cosine multiplier 32 and sine multiplier 34.

Between samples, N/L products are formed by the cosine multiplier 32 and the sine multiplier 34. At the same time, N/L sine and cosine products are produced at the output of each module 12 and summed with previous outputs as the index n varies from 0 to N-1. Each accumulator 36 has outputs corresponding to the real and imaginary parts of F(kr+mrN/L). At the end of a time equal to NT, the entire fast discrete Fourier transform F(w) is available at the outputs of the accumulators $36_0$ through $36_{L-1}$.

Figure 3:
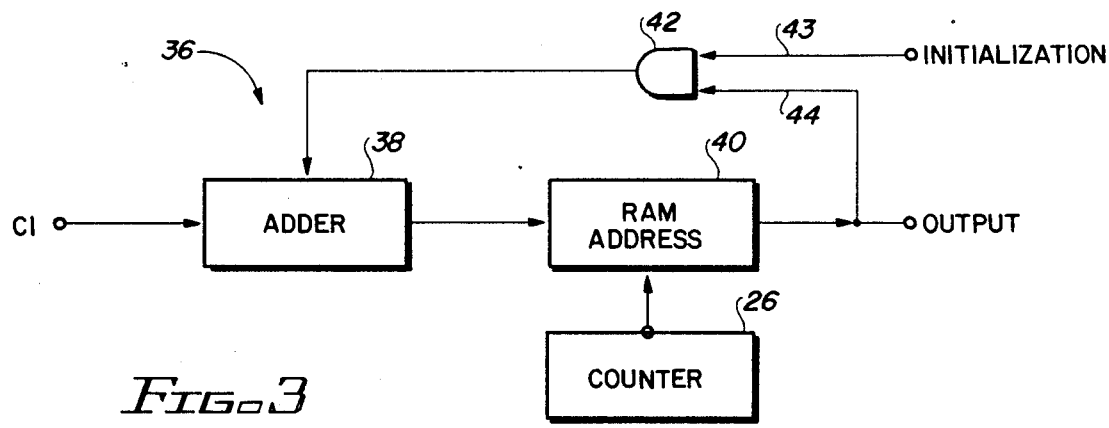
FIG. 3 is a schematic block diagram of circuitry for an accumulator.

A schematic block diagram of the circuit of each of the accumulators $36_0$ through $36_{L-1}$ is given in FIG. 3. The input to an accumulator 36 goes to an accumulator adder 38 which has an output leading to a random access memory RAM) 40 which also has a second input from counter 26 which provides the address. An "OR" gate 42 has a first input 43 on which an initialization pulse may be present and a second input 44 hooked up to the output of RAM 40. The output of "OR" gate 42 is connected to a second input of accumulator adder 38.

Figure 4:
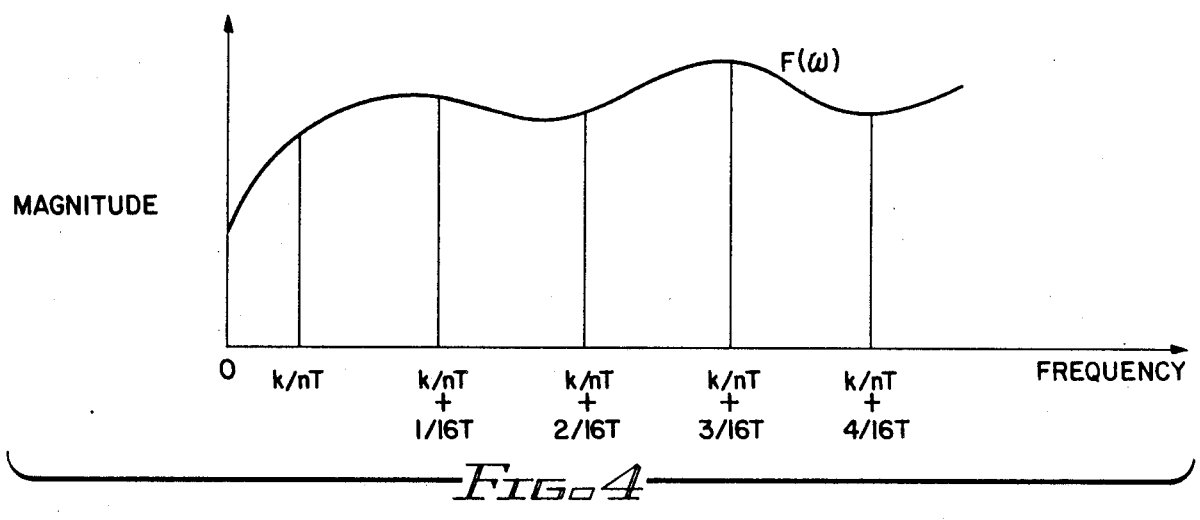
FIG. 4 is a graph of F(w) vs. frequency showing that F(kr +mrN/16) represents the value of the spectrum at a frequency removed by some multiple of 1/16T from k/NT.
Figure 5:
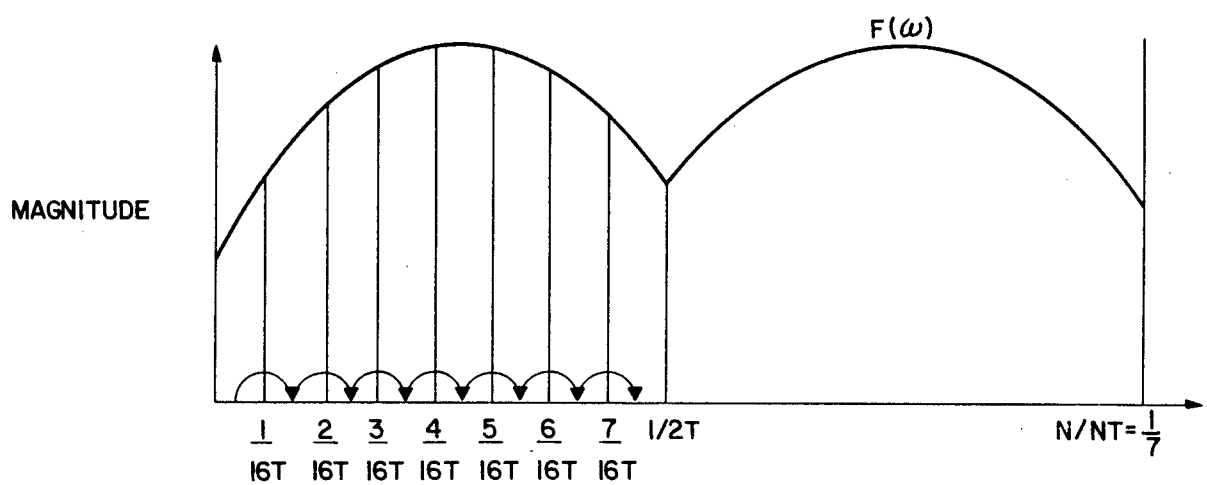
FIG. 5 is a graph of F(w) vs. frequency showing that eight spectrum values can be calculated simultaneously.

As can be seen from FIG. 4, which is a graph of a discrete fast Fourier transform F(w) vs. frequency, F(kr+mrN/16) represents the value of the spectrum at a frequency removed by some multiple of 1/16T from K/NT. FIG. 5 illustrates the fact that eight spectrum values can be calculated simultaneously.

The circuit elements making up the circuits of FIGS. 1, 2, and 3 on the lowest block diagram level are all standard and well-known in the art. Various equivalent implementations could be made by one of ordinary skill in the art.

The circuit to calculate a fast discrete Fourier transform according to the present invention as shown in FIG. 2 has a number of advantages. First of all there is no transport delay. Second, the transform is complete in a time T seconds after the last sample is received. Third, the circuit uses a minimum of multipliers. Fourth, it allows for the possibility of multiplexing samples. Fifth, the circuit is modular in construction. Sixth, the throughput of the circuit can be increased by using more multipliers. Seventh, the circuit makes use of a minimal amount of memory.

In contrast to conventional methods of calculating discrete fast Fourier transforms, which require using all frequencies and for which one cannot selectively look at a single frequency or bin, the method of the present invention is not limited in this way. Because of the large amount of repetition that takes place in using the present method, it is possible to keep the total amount of memory at a minimum. Conventional fast discrete Fourier transform calculation methods do not begin until all the samples are taken, which results in a large transport delay that necessitates very fast hardware. In contrast, the present method yields an output result one sample period after the last sample is taken. Thus, for a time series of 512 samples and a one MHZ sampling rate, the answer is ready in only one microsecond after the last sample is in.

Although there has been described above one specific arrangement of a circuit for calculating the fast discrete Fourier transform of a time series in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for computing the discrete Fourier transform of a sequence X(0), X(1), . . . , X(N-1) of sampled electromagnetic signals comprising:
   first multiplier means accepting said sequence as an input and having an output;
   second multiplier means accepting said sequence as an input and having an output;
   a cosine read-only memory (ROM) communicating with said first multiplier means;
   a sine read-only memory communicating with said second multiplier means;
   a plurality of module means, each having a first input connected to the output of said first multiplier means, and having a second input connected to the output of said second multiplier means; each said module means also having first and second outputs;
   first accumulator means having a first input connected to the output of said first multiplier means and a second input connected to the output of said second multiplier means; and
   a plurality of additional accumulator means identical to said first accumulator means, each said additional accumulator means having first and second inputs connected to said first and second outputs of a corresponding module means;
   each said accumulator means having first and second outputs which are the real and imaginary parts of one component of said discrete Fourier transform.

2. The apparatus of claim 1 in which each said module means comprises:
   counter means having an output;
   a first read-only memory (ROM) having a first input connected to the output of said counter means and a second input connected to the output of said first multiplier means;
   a second read-only memory having a first input connected to the output of said counter means and a second input connected to the output of said first multiplier means;
   a third read-only memory having a first input connected to the output of said counter means and a second input connected to the output of said second multiplier means;
   a fourth read-only memory having a first input connected to the output of said counter means and a second input connected to the output of said second multiplier means;
   a first adder means having first and second inputs connected to the outputs of said first and third read-only memories, and having an output which is said first output of said module; and
   a second adder means having first and second inputs which are connected to the outputs of said second and fourth read-only memories, and having an output which is said second output of said module.

3. The apparatus of claim 2 in which said first and second inputs of each said read-only memory are arranged to make up an address of a memory location in said read-only memory.

4. The apparatus of claim 3 in which each said accumulator means connected to the output of each said module means comprises:
   an "OR" gate having a first input connected to the output of said accumulator means and a second input connected to a source of an initialization pulse, and an output;
   accumulator adder means having a first input connected to one of said outputs of said module means and a second input connected to the output of said "OR" gate, and an output; and
   a random access memory (RAM) addressed by said counter means, having a second input connected to the output of said accumulator adder means and having an output which is the output of said accumulator means.

5. The apparatus of claim 2 in which said module means comprises:
   a first read-only memory (ROM) having a first input connected to the output of said counter means and a second input which is said sequence multiplied by the cosine of nkr, and an output;

a second read-only (ROM) having a first input connected to the output of said counter means and a second input which is said sequence multiplied by the sine of nkr, and an output; and module adder means having a first input which is the output of said first ROM, a second input which is the output of said second ROM, and an output which is said sequence multiplied by the cosine of (nkr+NTπ/8);

where n is the number of a term in the sequence,
k is a proportionality constant,
T is the time between succeeding sample terms in the sequence, and
N is the number of terms in the sequence.

* * * * *